United States Patent
Park et al.

(10) Patent No.: US 7,380,045 B2
(45) Date of Patent: May 27, 2008

(54) PROTOCOL CONVERSION AND ARBITRATION CIRCUIT, SYSTEM HAVING THE SAME, AND METHOD FOR CONVERTING AND ARBITRATING SIGNALS

(75) Inventors: Sun-hee Park, Suwon-si (KR); Hyun-woo Park, Suwon-si (KR); Keun-cheol Hong, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/062,951

(22) Filed: Feb. 23, 2005

(65) Prior Publication Data

US 2005/0188144 A1 Aug. 25, 2005

(30) Foreign Application Priority Data

Feb. 24, 2004 (KR) ...................... 10-2004-0012287

(51) Int. Cl.
G06F 13/00 (2006.01)
(52) U.S. Cl. ..................................... 710/315
(58) Field of Classification Search ................. 710/315
See application file for complete search history.

(56) References Cited

U.S. PATENT DOCUMENTS

| | | | | |
|---|---|---|---|---|
| 4,665,483 A | * | 5/1987 | Ciacci et al. ................ | 710/114 |
| 5,375,250 A | | 12/1994 | Van den Heuvel | |
| 5,506,973 A | * | 4/1996 | Okazawa et al. ........... | 710/305 |
| 5,845,107 A | * | 12/1998 | Fisch et al. .................. | 710/315 |
| 5,937,172 A | | 8/1999 | Arimilli et al. | |
| 6,047,002 A | | 4/2000 | Hartmann et al. | |
| 6,148,357 A | | 11/2000 | Gulick | |
| 6,272,579 B1 | | 8/2001 | Lentz et al. | |
| 6,895,447 B2 | * | 5/2005 | Brewer et al. ................ | 710/11 |
| 2002/0002662 A1 | | 1/2002 | Olarig et al. | |
| 2002/0019891 A1 | | 2/2002 | Morrow et al. | |
| 2002/0184467 A1 | * | 12/2002 | Saen et al. ................... | 711/202 |

(Continued)

FOREIGN PATENT DOCUMENTS

| EP | 0 259 786 A1 | 3/1988 |
|---|---|---|
| EP | 0 412 268 A1 | 6/1990 |
| JP | 2000-29823 A | 1/2000 |

(Continued)

OTHER PUBLICATIONS

Foreign Search Report dated Apr. 14, 2005.

(Continued)

*Primary Examiner*—Glenn A. Auve
(74) *Attorney, Agent, or Firm*—Harness, Dickey & Pierce, P.L.C.

(57) ABSTRACT

A protocol conversion and arbitration circuit may include: a protocol conversion circuit to receive signals complying with a second protocol used by a master, and to convert the received signals into signals complying with an intermediary protocol used by an internal bus of a slave; and a transform circuit to receive, from the protocol conversion circuit, and to convert the once-converted signals into signals complying with a first protocol used by the slave.

17 Claims, 9 Drawing Sheets

U.S. PATENT DOCUMENTS

2003/0046478 A1* 3/2003 Pertry et al. .................... 711/5
2003/0067934 A1* 4/2003 Hooper et al. ............... 370/428
2006/0015673 A1* 1/2006 Morrow ...................... 710/315

FOREIGN PATENT DOCUMENTS

WO          WO 03/019841 A2      3/2003

OTHER PUBLICATIONS

Korean Patent Office Action dated Dec. 12, 2005, for KR App. No. 10-2004-0012287 (with English translation).
United Kingdom Examination Report under Section 18(3) dated Oct. 13, 2006.
German Patent Office Search Report dated May 3, 2007, for corresponding German Patent Application No. 102005009293.4-53, corresponding to Korean Patent Application No. 10-2004-0012287.
German Patent Office Action dated Dec. 13, 2007, for counterpart German Patent Application No. 10 2005 009 293.4-53.
Fumio Aono and Masayuke Kimura, "The Azusa 16-way Itanium server", Micro, IEEE, Sep.-Oct. 2000, vol. 20, Issue 5, pp. 54-60.
"MultiPort Memory Controller (GS175) Revision: r0p0", Technical Reference Manual, ARM Limited, 2002, pp. i, ii, 2-28.

* cited by examiner

PROTOCOL CONVERSION AND ARBITRATION CIRCUIT, SYSTEM HAVING THE SAME, AND METHOD FOR CONVERTING AND ARBITRATING SIGNALS

CROSS-REFERENCE TO RELATED APPLICATION

This application claims the priority of Korean Patent Application No. 2004-12287, filed on Feb. 24, 2004, in the Korean Intellectual Property Office, the disclosure of which is incorporated herein in its entirety by reference.

BACKGROUND OF THE INVENTION

FIG. 1 is a block diagram of a system according to the Background Art having a memory controller with only one port.

Referring to FIG. 1, a system board 100 has a system 110 and an external memory 121. The system 110 includes a memory controller 111, an advanced high-performance bus (AHB) 114, an APB bridge 117, an advanced peripheral bus (APB) 119, a plurality of AHB masters 112 and 115, an AHB slave 116, and an APB slave 118.

Here, the memory controller 111, the AHB 114, the APB bridge 117, the APB 119, and the plurality of AHB master 112, AHB master 115, AHB slave 116, and APB slave 118 support (or use) only one (and the same) protocol, for example, an advanced micro-controller bus architecture (AMBA) protocol.

The memory controller 111 controls data input and output between each of the plurality of AHB master 112, AHB master 115, AHB slave 116, and APB slave 118, and the external memory 121. Also, the memory controller 111 is connected to the AHB 114 through one port 113. Each module AHB master 112, AHB master 115, and AHB slave 116 is connected to the AHB 114. Here, the AHB 114 is used as a system bus.

Accordingly, each of the AHB master 112, AHB master 115, AHB slave 116 and APB slave 118 can write data to or read data from the external memory 121 through a path that includes the system bus 114, the memory controller 111 via port 113, and input/output pins 120. Since in order to write data in and read data from the external memory 121, each AHB master 112, AHB master 115, AHB slave 116, and APB slave 118 should use the system bus 114, the load of the system bus 114 increases and as a result, the entire performance of the system is also lowered.

FIG. 2 is a block diagram of a system according to the Background Art having a multiport memory control. Referring to FIG. 2, the system board 200 has a system 210 and an external memory 224. The system 210 includes a memory controller 211, a system bus (AHB) 213, an APB bridge 216, an APB bus 217, a plurality of AHB master 212, AHB master 214, AHB slave 215, and HPB slave 218, and a plurality of buses 221, . . . , 222.

The memory controller 211 has a plurality of ports 220-1 trough 220-n capable of being connected to each of the plurality of modules. Hereinafter, the memory controller 211 having the plurality of ports 220-1 through 220-n will be referred to as a 'multiport memory controller'.

All of the multiport memory controller 211, the system bus 213, the APB bridge 216, the APB bus 217, the AHB master 212, AHB master 214, AHB slave 215, and APB slave 218 support (or use) only one (and the same) protocol (for example, the AMBA protocol).

SUMMARY OF THE INVENTION

At least some embodiments of the present invention provide examples of an apparatus having a structure in which the performance of a system can be improved, different protocols can be freely supported, and modules already manufactured with little to no modification thereof can be reused.

At least one embodiment of the present invention provides a protocol conversion and arbitration circuit. Such a circuit may include: a protocol conversion circuit which receives signals complying with a protocol used by a master, and converts the received signals into signals complying with a protocol used by a system bus of a slave; and a conversion circuit which receives the output signals of the protocol conversion circuit, and converts the received output signals into signals complying with a protocol used by the slave.

Additional features and advantages of the invention will be more fully apparent from the following detailed description of example embodiments, the accompanying drawings and the associated claims.

BRIEF DESCRIPTION OF THE DRAWINGS

The above and other features and advantages of the present invention will become more apparent by describing in detail example embodiments thereof with reference to the attached drawings in which.

Figure 1:
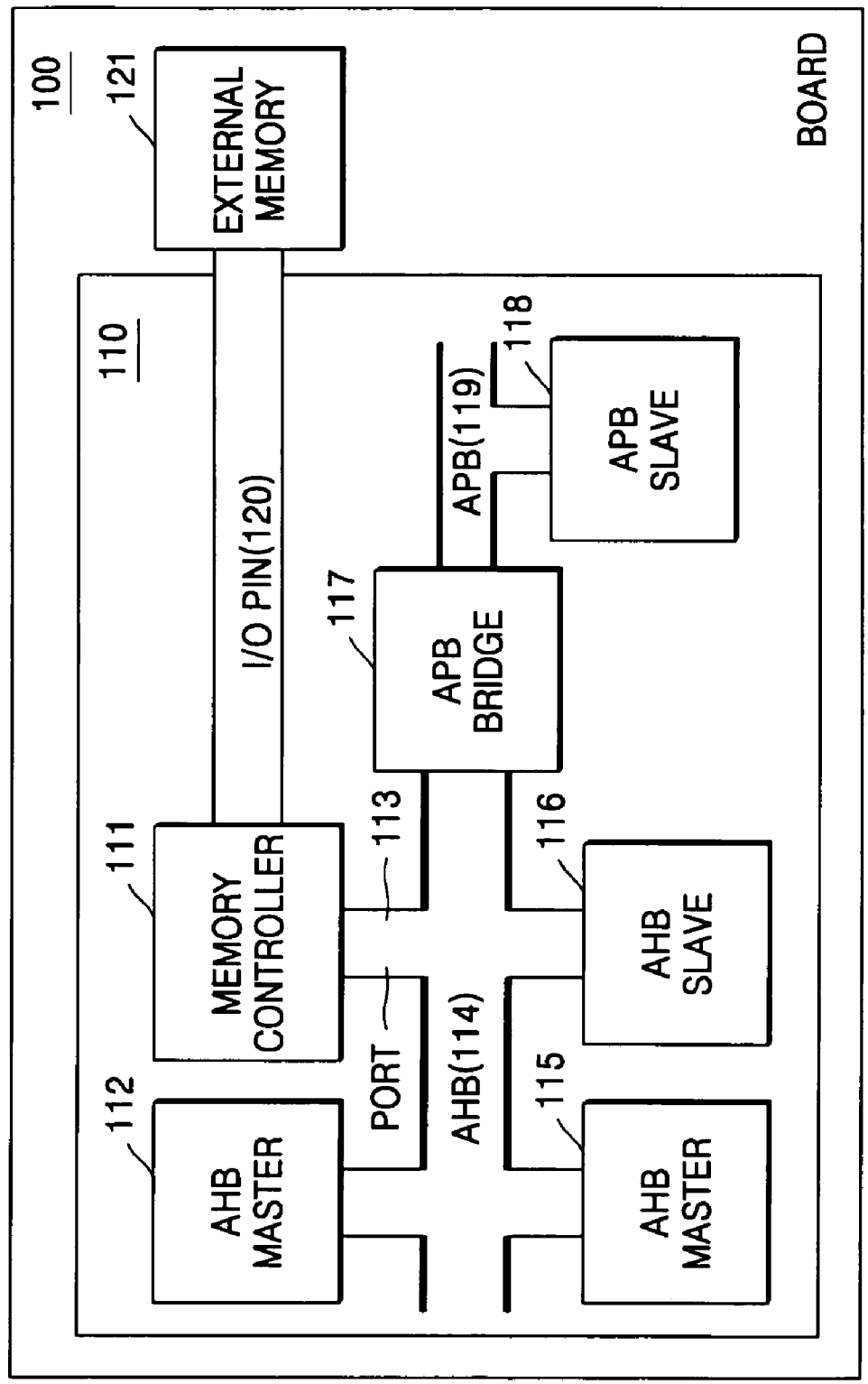
FIG. 1 is a block diagram of a system according to the Background Art having a memory controller with only one port.
Figure 2:
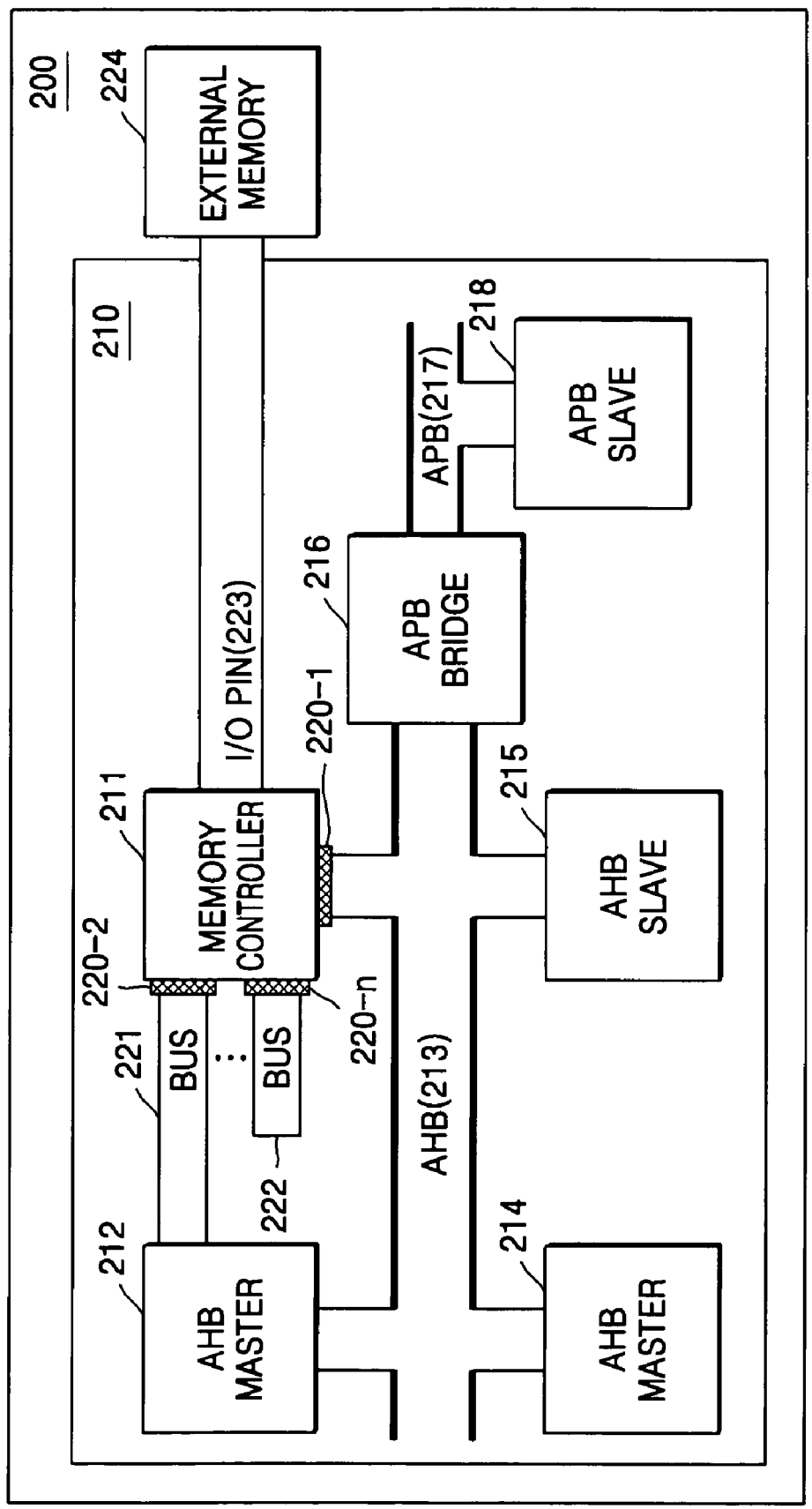
FIG. 2 is a block diagram of a system according to the Background Art having a multiport memory controller.

While example embodiments of the present invention are described more fully with reference to the accompanying drawing, the present invention may be embodied in many different forms and should not be construed as being limited to the example embodiments set forth herein; rather, these example embodiments are provided so that this disclosure is thorough and complete, and conveys the concept of the present invention to those skilled in the art. Some portions of the drawings may be exaggerated for clarity, hence, the drawings are not to be considered as drawn to scale unless explicitly noted. In the drawings, whenever the same element reappears in subsequent drawings, it is denoted by the same reference numeral.

DETAILED DESCRIPTION OF THE INVENTION

Hereinafter, the present invention will be described in detail by explaining example embodiments of the invention with reference to the attached drawings.

Figure 3:
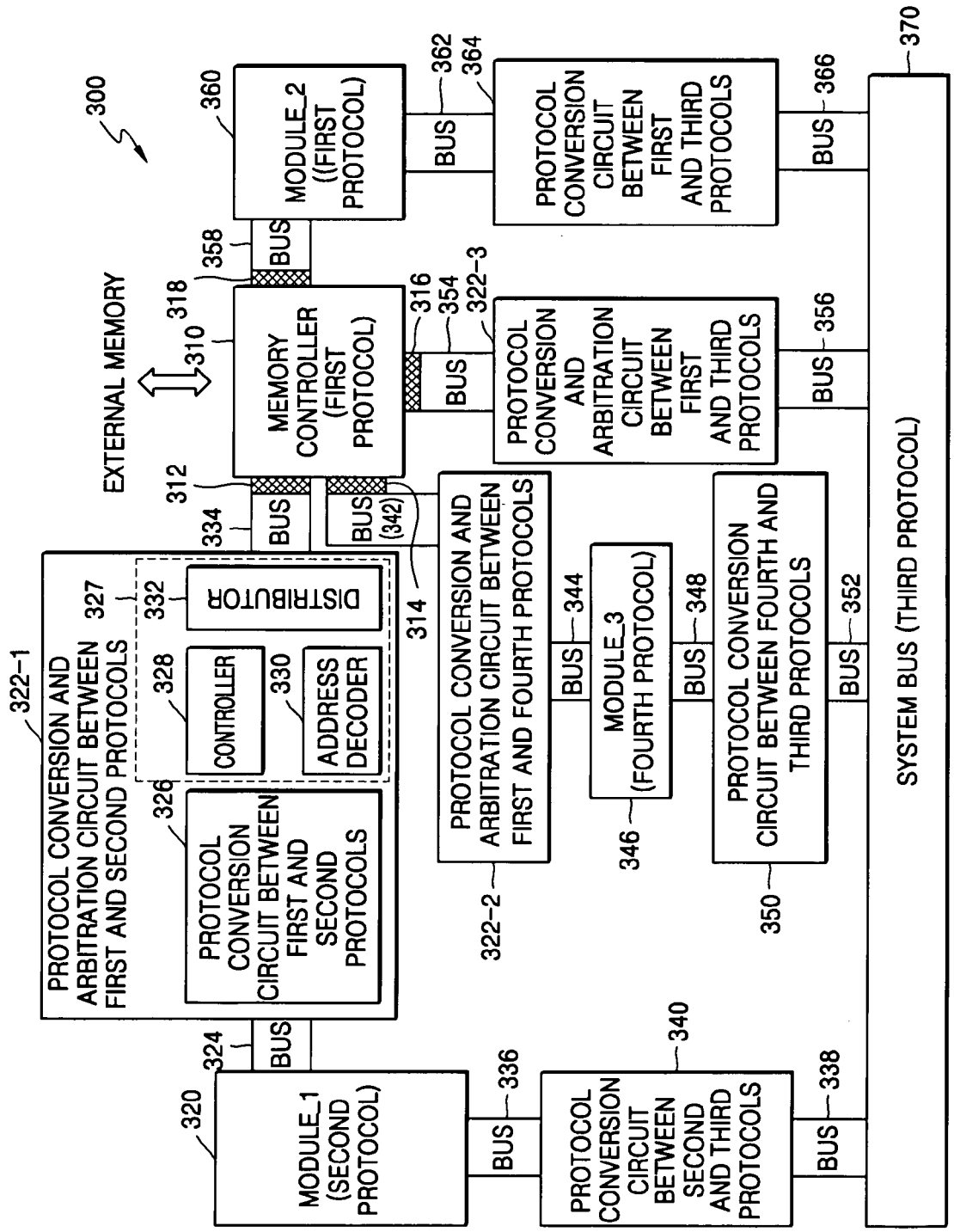
FIG. 3 is a block diagram of a system according to at least one embodiment of the present invention in which one protocol conversion and arbitration circuit is connected to one module.

FIG. 3 is a block diagram of a system according to at least one embodiment of the present invention in which one protocol conversion and arbitration circuit is connected to one module.

Referring to FIG. 3, the system 300 includes a multiport memory controller 310, a plurality of modules, namely module_1 320, module_3 346, and module_2 360, a plurality of protocol conversion and arbitration (or, in other words, liaison) circuits 322-1, 322-2, and 322-3, a plurality of protocol conversion circuits 340, 350, and 364, a system bus 370, and a plurality of buses 324, 334, 336, 338, 342, 348, 352, 354, 356, 358, 362, and 366. Also, the system 300 has at least one data input and output pin (not shown) for communicating data with at least one external memory (not shown).

Hereinafter, circuits 322-1 and 322-2 connected between the multiport memory controller 310 and respectively corresponding module_1 320 and module_3 346, and the circuit 322-3 connected between the multiport memory controller 310 and the system bus 370 will be referred to as protocol conversion and arbitration circuits. The structure of the protocol conversion and arbitration circuits 322-1, 322-2, and 322-3 can be as shown, e.g., in FIG. 6 or 7.

The protocol conversion and arbitration circuit converts signals complying with a second protocol used in a master, into signals complying with an intermediary protocol used by a corresponding slave, e.g., a protocol used by an internal bus of the slave, and then again converts the once-converted signals into signals complying with a first protocol used in the slave to facilitate their use by the slave through a signal control process, a signal arbitrating process, and/or a signal decoding process.

Meanwhile, a circuit which is connected between modules using different protocols or between the module_2 360 and the system bus 370 using different protocols will be referred to as a protocol conversion circuit.

Accordingly, such a protocol conversion circuit performs a conversion of signals complying with the second protocol used in a master into signals complying with the intermediary protocol used in the internal bus of the corresponding slave.

Here, for convenience of explanation, it is assumed that the multiport memory controller 310 uses (or supports) a first protocol, module_1 320 uses a second protocol, module_2 360 uses the first protocol, module_3 346 uses a fourth protocol and the system bus 370 uses a third protocol.

The multiport memory controller 310 has a plurality of ports 312, 314, 316, and 318, and controls communication of data between each of the module_1 320, module_3 346, and module_2 360 and the external memory through the system bus 370. The protocol conversion and arbitration circuit 322-1 is connected between a master (for example, module_1 320) and the first port 312 of the memory controller 310.

Figure 6:
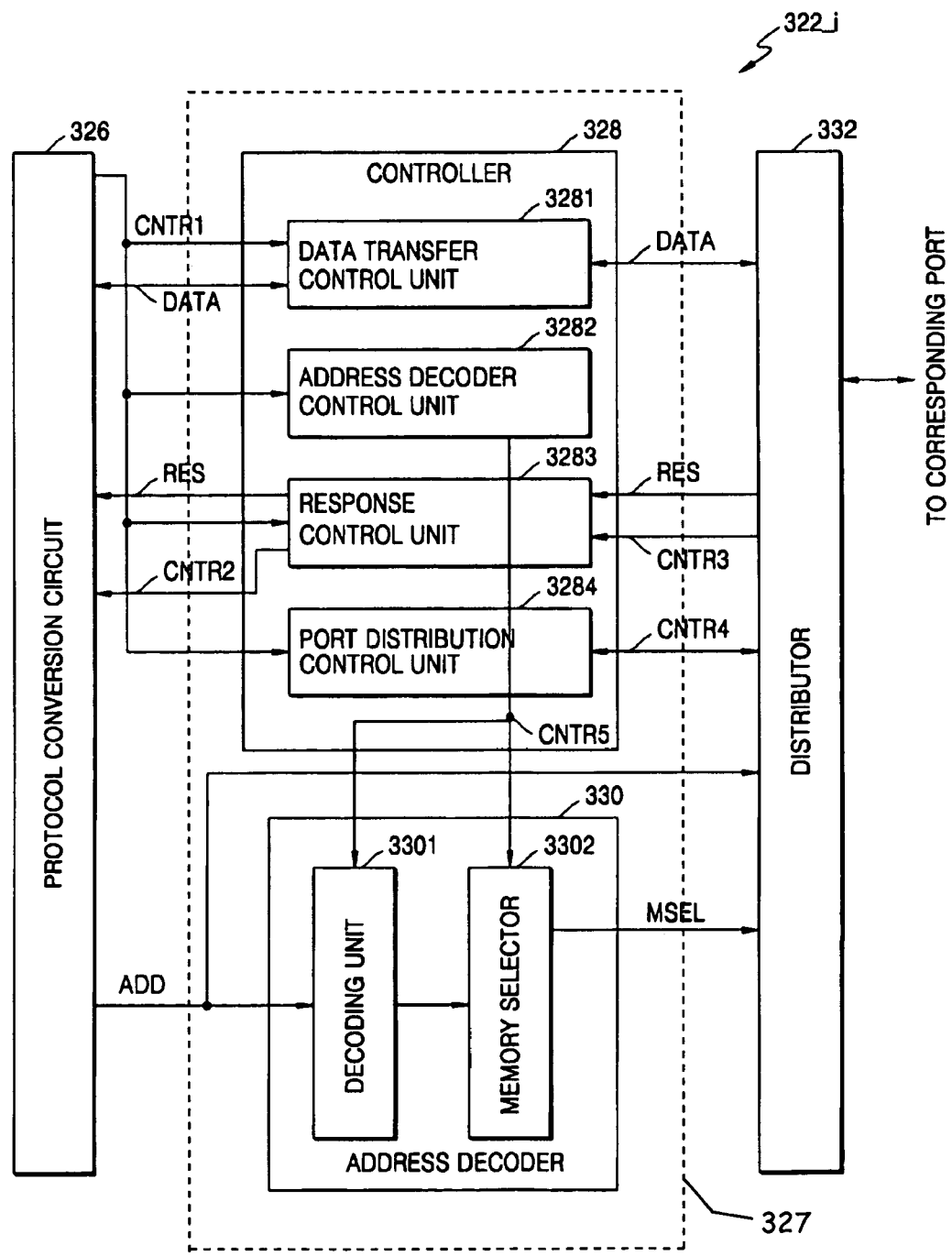
FIG. 6 is a block diagram of a protocol conversion and arbitration circuit according to at least one embodiment of the present invention.

FIG. 6 is a block diagram of a protocol conversion and arbitration circuit according to at least one embodiment of the present invention. Referring to FIG. 6, the protocol conversion and arbitration circuit 322-1 includes a protocol conversion circuit 326, a controller 328, an address decoder 330, and a distributor 332. The operation of the protocol conversion and arbitration circuit shown in FIGS. 3 and 6 can be explained (according to at least one embodiment of the present invention) at least in part by referring to the flowchart of FIG. 8.

Figure 8:
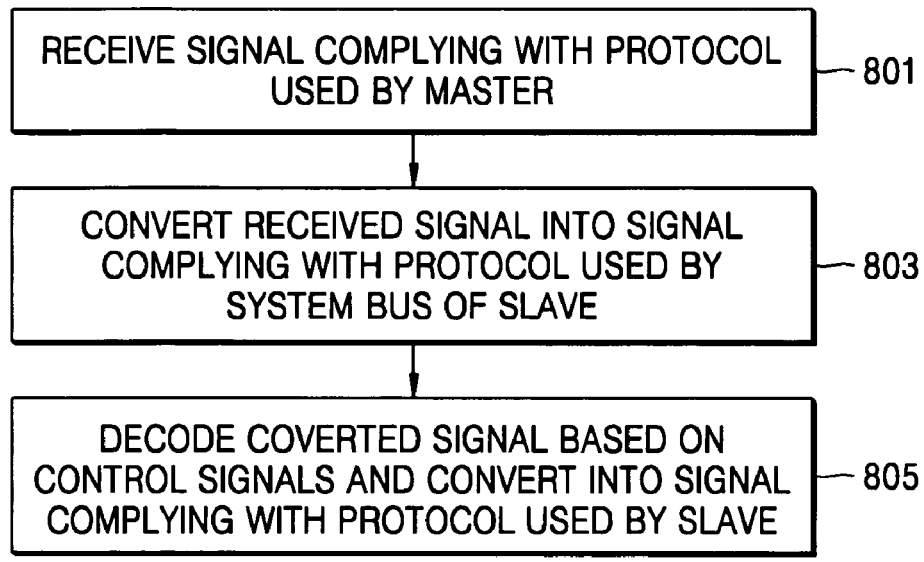
FIG. 8 is a flowchart according to at least one embodiment of the present invention that can explain (at least in part) the operation of the protocol conversion and arbitration circuit shown in FIG. 3.

Referring to FIGS. 3, 6, and 8, the protocol conversion circuit 326 receives a signal complying with the second protocol used by a master (for example, module_1 320) through the bus 324 in step 801, converts the received signal into signals (CNTR1, DATA, and ADD) complying with the protocol used by the internal bus (not shown) of a slave (for example, the memory controller 310), and outputs the converted signals (CNTR1, DATA, ADD) to the controller 328, the address decoder 330, and the distributor 332 in step 803.

The controller 328 in response to the control signals (CNTR1) output from the protocol conversion circuit 326, outputs a variety of control signals (CNTR4 and CNTR5) to control the address decoder 330 and the distributor 332, respectively, to the address decoder 330 and the distributor 332.

The controller 328 includes a data transfer control unit 3281, an address decoder control unit 3282, a response control unit 3283, and a port distribution control unit 3284.

The data transfer control unit 3281 in response to at least one corresponding control signal among the control signals (CNTR1), transmits data (DATA) output from the protocol conversion circuit 326, to the distributor 332, or transmits data (DATA) input from the distributor 332, to the protocol conversion circuit 326.

The address decoder control unit 3282 in response to at least one corresponding control signal among the control signals (CNTR1), outputs control signals (CNTR5) to the address decoder 330.

The response control unit 3283 in response to at least one corresponding control signal among control signals (CNTR1) output from the protocol conversion circuit 326, or in response to at least one corresponding control signal among control signals (CNTR3) output from the distributor 332, transmits information on the state of an external memory to be accessed, or information (RES) related to the transmission state of data (DATA), to the protocol conversion circuit 326. Also, the response control unit 3283 generates control signals (CNTR2) to control the operation of the protocol conversion circuit 326.

The port distribution control unit 3284 in response to at least one corresponding control signal among the control signals (CNTR1) output from the protocol conversion circuit 326, outputs control signals (CNTR4) to the distributor 332 that control the operational states of each of the multiple ports of the memory controller 310.

The address decoder 330 in response to control signals (CNTR5) output from the controller 328, decodes an address (ADD) output from the protocol conversion circuit 326, and as the result, outputs information (MSEL) to the distributor 332 regarding the external memory which a master (for example, module_1 320) desires to access.

The address decoder 330 includes a decoding unit 3301 and a memory selector 3302. The decoding unit 3301 in response to at least one corresponding control signal among control signals (CNTR5) output from the controller 328, decodes an address (ADD) output from the protocol conversion circuit 326, and outputs the result to the memory selector 3302.

The memory selector 3302, in response to at least one corresponding control signal among control signals (CNTR5) output from the address decoder control unit 3282 of the controller 328 and the output signal of the decoding unit 3301, outputs information (MSEL) to the distributor 332 regarding the external memory which a master (for example, module_1 320) desires to access. The information (MSEL) regarding the external memory, for example, the number of bits, is determined by the number of the external memories.

The distributor 332 receives an address (ADD) output from the protocol conversion circuit 326, data (DATA) and control signals (CNTR4) output from the controller 328, and information (MSEL) regarding the external memory output from the address decoder 330, and based on this information (ADD, DATA, CNTR4 and MSEL) transmits signals required for accessing the external memory to a corresponding port 312. Accordingly, the distributor 332 has a switching function and/or a multiplexing function.

The signals (CNTR1, DATA, and ADD), complying with the intermediary protocol used by the internal bus of the slave and output from the protocol conversion circuit 326, are converted into signals complying with a protocol used by a slave to facilitate their use by the slave (for example, the memory controller 310) via interoperations of the controller 328, the address decoder 330, and the distributor 332. Together, the controller 328, the address decoder 330 and the distributor 332 can be described as a middleman circuit 327. The converted signals are input to the memory controller 310 through the bus 334 and the port 312 in step 805.

Accordingly, the controller 328, the address decoder 330, and the distributor 332 perform the function of converting the signals output by the protocol conversion circuit 326 into signals complying with a protocol used in the memory controller 310 so as to facilitate their use by the memory controller 310.

Therefore, the memory controller 310 accesses the external memory which the module_1 320 desires to access, based on the signals output from the protocol conversion and arbitration circuit 322-1.

Also, the controller 328 of the protocol conversion and arbitration circuit 322-1 receives data (DATA) read from the accessed external memory, that is, signals complying with the protocol of the memory controller 310, converts the received data (DATA) into signals complying with the intermediary protocol used by its internal bus through the distributor 332 and the controller 328, and outputs the once-converted signals to the protocol conversion circuit 326.

The protocol conversion circuit 326 converts the once-converted signals complying with the intermediary protocol used by the internal bus of the memory controller 311, into signals complying with the protocol used by the module_1 320, and outputs the twice-converted signals to the master.

The protocol conversion and arbitration circuit 322-2 is connected between module_3 346 and the second port 314 of the memory controller 310. The protocol conversion and arbitration circuit 322-2 receives signals complying with the fourth protocol used by a master (for example, module_3 346) through the bus 344, converts the received signals into signals complying with the protocol used by the slave (for example, the memory controller 310) by using a protocol conversion circuit (not shown), converts the once-converted signals to facilitate their use by the memory controller 310 through operation of the controller 328, the address decoder 330, and the distributor 332 as described above, and transmits the twice-converted signals to the memory controller 310 through the bus 342 and the second port 314. Accordingly, module_3 346 can indirectly access the desired external memory (not shown) through a corresponding port 314 rather than, e.g., via system bus 370.

In addition, the protocol conversion and arbitration circuit 322-2 receives signals complying with the first protocol and that have been read from the accessed external memory via the second port 314 of the memory controller 310 and the bus 342, converts the received signals into signals complying with the protocol used in the system bus (not shown) of the memory controller 310 through the distributor 332, the controller 328, and the address decoder, converts again the once-converted signals into signals complying with the fourth protocol used in module_3 346 by using a protocol conversion circuit (not shown), and transmits the converted signals to the module_1 320 through the bus 344.

The protocol conversion and arbitration circuit 322-3 is connected between the third port 316 of the memory controller 310 and the system bus 370. The protocol conversion and arbitration circuit 322-3, through the two-stepped conversion process as described above, converts signals complying with the third protocol used in the system bus 370 into signals complying with the first protocol used in the memory controller 310, or converts signals complying with the first protocol used in the memory controller 310 into signals complying with the third protocol used in the system bus 370.

Figure 9:
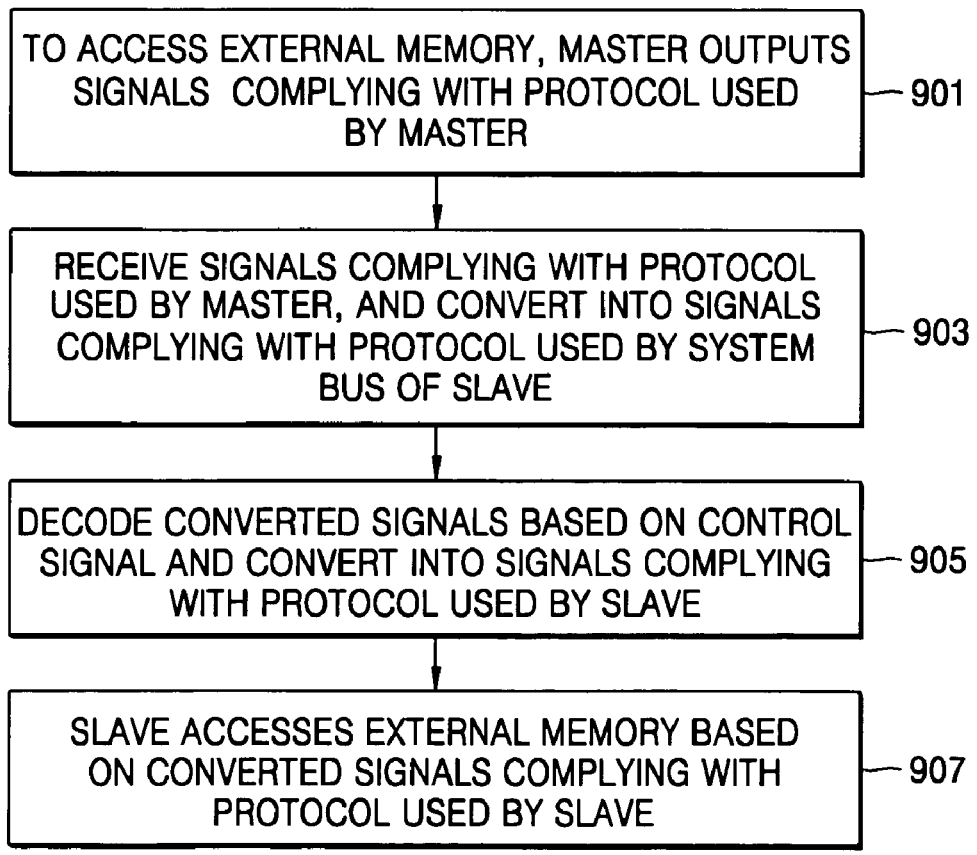
FIG. 9 is a flowchart according to at least one embodiment of the present invention that can explain (at least in part) a method for a master to access an external memory through a protocol conversion and arbitration circuit.

FIG. 9 is a flowchart to explain a method for a master to access an external memory through a protocol conversion and arbitration circuit according to at least one embodiment of the present invention. Referring to FIGS. 3, 6, and 9, a process for a master accessing an external memory will now be explained.

In order to access an external memory, each of module_1 320, module_3 346, and the system bus 370 outputs signals complying with a protocol used by the module_1 320, module_3 346, and the system bus 370, to the protocol conversion and arbitration circuits 322-1, 322-2, and 322-3, respectively, in step 901.

The protocol conversion circuit 326 of each of the protocol conversion and arbitration circuits 322-1, 322-2, and 322-3 receives signals complying with a protocol used by a corresponding module_1 320, module_3 346, and the system bus 370, and converts the received signals into signals complying with a protocol used by an internal bus (not shown) of the memory controller 310 in step 903.

A variety of signals (CNTR1, DATA, and ADD) output from the protocol conversion circuit 326 of each of the protocol conversion and arbitration circuits 322-1, 322-2, and 322-3 are again converted into signals complying with the first protocol used by the slave to facilitate their use by the slave (again, e.g., the memory controller 310) via cooperative interaction of the controller 328, the address decoder 330 and the distributor 332 in step 905.

Based on the receved signnals, the memory controller 310 accesses an external memory which each module_1 320, module_1 346, and the system bus 370 desires to access in step 907.

Referring to, FIG. 3, the 2-3 protocol conversion circuit 340 is connected between module_1 320 and the system bus 370, and the protocol conversion circuit 340 and module_1 320 are connected to each other through the bus 336. The protocol conversion circuit 340 and the system bus 370 are connected to each other through the bus 338.

The 2-3 protocol conversion circuit 340 converts signals complying with the second protocol used in module_1 320 into signals complying with the third protocol used in the system bus 370, and converts signals complying with the third protocol used in the system bus 370 into signals complying with the second protocol used in module_1 320.

The 4-3 protocol conversion circuit 350 is connected between module_3 346 and the system bus 370 and the bus 348 connects the 4-3 protocol conversion circuit 350 and module_3 346. The bus 345 connects the 4-3 protocol conversion circuit 350 and the system bus 370.

The 4-3 protocol conversion circuit 350 converts signals complying with the fourth protocol used in module_3 346 into signals complying with the third protocol used in the system bus 370, and converts signals complying with the third protocol used in the system bus 370 into signals complying with the fourth signal used in module_3 346.

The 1-3 protocol conversion circuit 364 is connected between module_2 360 and the system bus 370 and the bus 358 connects the fourth port 318 of the memory controller 310 and the system bus 370. The bus 366 connects the 1-3 protocol conversion circuit 364 and the system bus 370.

The 1-3 protocol conversion circuit 364 converts signals complying with the first protocol used in module_2 360 into signals complying with the third protocol used in the system bus 370 and converts signals complying with the third protocol used in the system bus 370 into signals complying with the first protocol used in module_2 360.

The system bus 370 is an on-chip bus. However, it is not limited to an on-chip bus. The system bus 370 may use an open core protocol or an AMBA protocol. However, the protocol that the system bus 370 bus can use is not limited to the open core protocol or the AMBA protocol.

Accordingly, since the memory controller 310 of a system having at least one protocol conversion and arbitration circuit according to the example embodiment of the present invention can support a plurality of devices (including module_1 320, module_3 346, and the system bus 370) using different protocols at the same time, and each of the plurality of module_1 320 module_3 346, and the system bus 370 can access an external memory through a corresponding port 312, 314, and 318, the entire performance of the system 300 is improved.

Also, even when a protocol supported by each module_1 320, module_3 346, and the system bus 370 is different from a protocol supported by the memory controller 310, each module_1 320, module_3 346, and the system bus 370 can be used in the system without changing the design. Accordingly, each module_1 320, module_3 346 and the system bus 370 is reusable.

Figure 4:
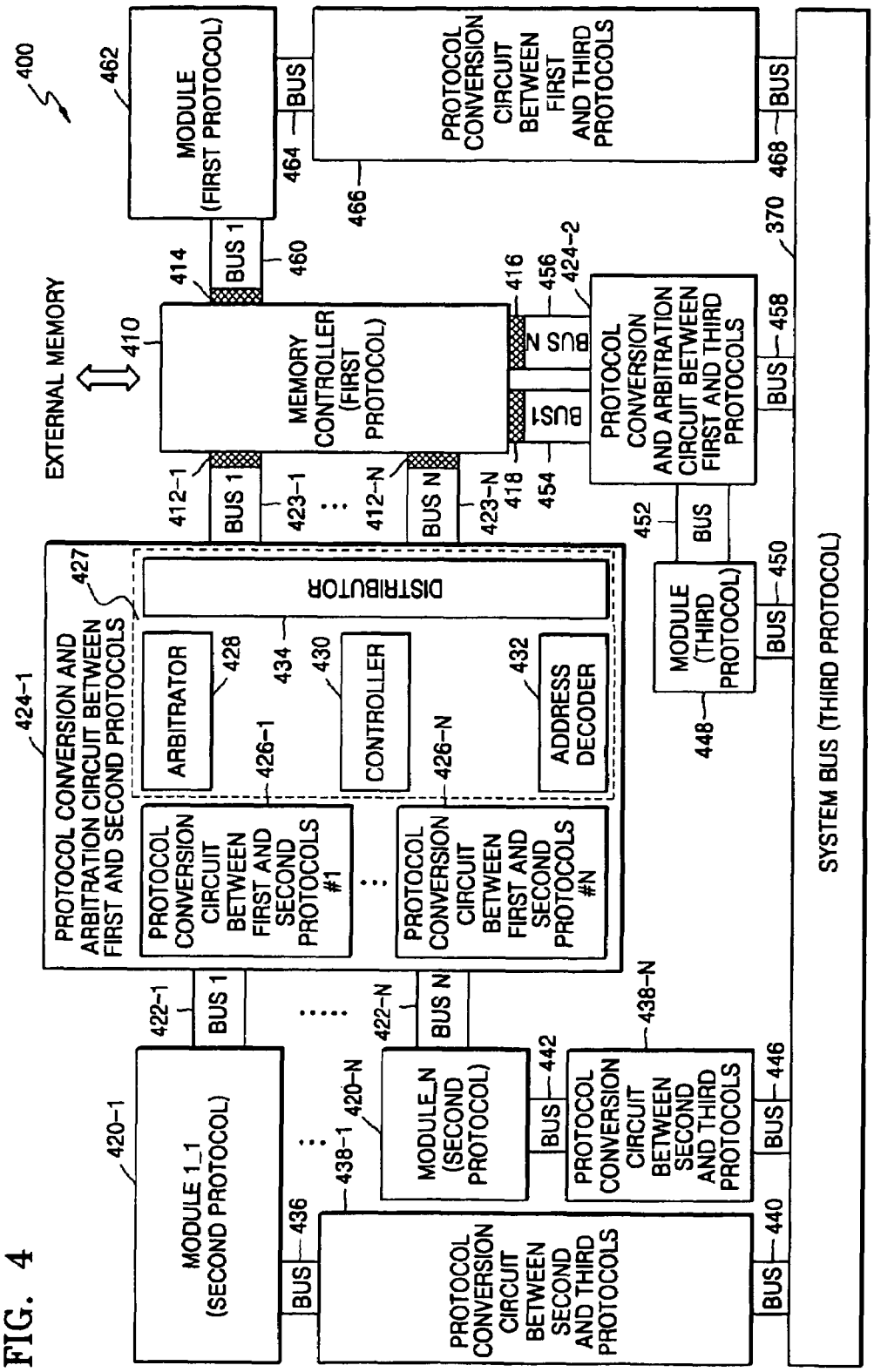
FIG. 4 is a block diagram of a system according to at least one other embodiment of the present invention in which one protocol conversion and arbitration circuit is connected to a plurality of modules using an identical protocol.

FIG. 4 is a block diagram of a system 400 according to at least one other embodiment of the present invention in which one protocol conversion and arbitration circuit is connected to a plurality of modules, module_1 420-1 through module_N 420-N (here, N is a natural number), using an identical protocol.

Referring to FIG. 4, the system 400 includes a memory controller 310, a plurality of protocol conversion and arbitration circuits 424-1 and 424-2, a plurality of modules (module_1 420-1 through module_N 420-N), 448, and 462, a plurality of protocol conversion circuits 438-1 through 438-N, and 466, a system bus 370, and a plurality of buses. The system 400 can be implemented by a semiconductor chip.

The memory controller 310 has a plurality of ports 412-1 through 412-N, 414, 416, and 418. At least one module (not shown) connected to at least one of the modules (module_1 420-1 through module_N 420-N), 448 and 462) and the system bus 370 controls operations to write data in and/or read data from an external memory through the system bus 370.

Here, for convenience of explanation, it is assumed that the memory controller 310 and the module 462 use the first protocol, the modules module_1 420-1 through module_N 420-N use the second protocol, and the module 448 and the system bus 370 use the third protocol.

Each of the modules module_1 420-1 through module_N 420-N that use an identical protocol is connected to a corresponding left port (not shown) of the protocol conversion and arbitration circuit 424-1 through a corresponding bus 422-1 through 422-N. Also, each of the right ports (not shown) of the protocol conversion and arbitration circuit 424-1 is connected to a corresponding port 412-1 through 412-N through a corresponding bus 423-1 through 423-N.

Accordingly, the protocol conversion and arbitration circuit 424-1 has the same number of left ports and right ports as the number of modules to be connected.

Also, the protocol conversion and arbitration circuit 424-1 has the same number of protocol conversion circuits 426-1 through 426-N as the number of modules to be connected, and at least one arbitrator 428.

Figure 7:
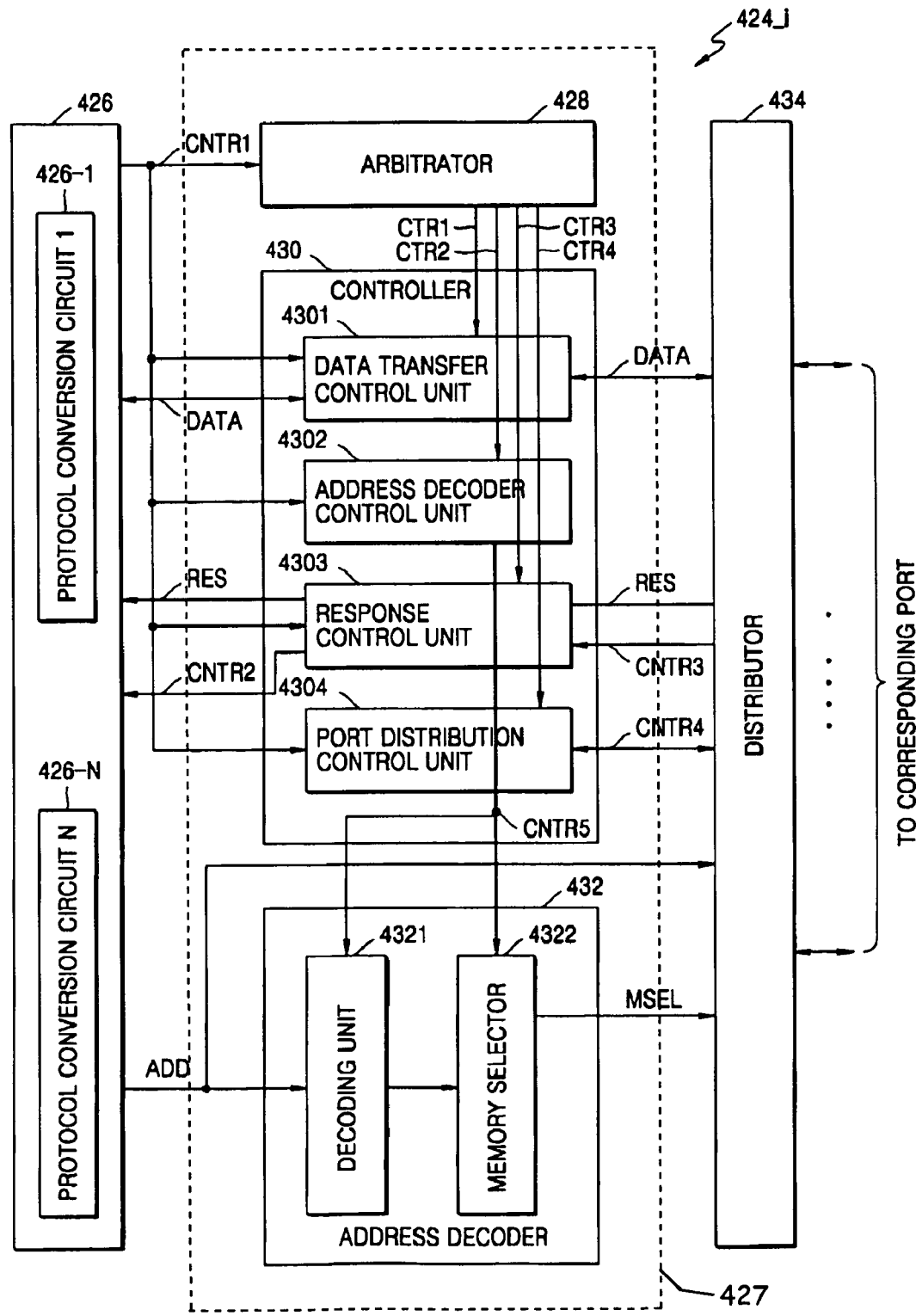
FIG. 7 is a block diagram of a protocol conversion and arbitration circuit according to at least one other embodiment of the present invention.

FIG. 7 is a block diagram of a protocol conversion and arbitration circuit according to at least one other embodiment of the present invention. Referring to FIG. 7, the protocol conversion and arbitration circuit 424-1 includes a protocol conversion circuit block 426 and a middleman circuit 427, which itself includes an arbitrator 428, a controller 430, an address decoder 432, and a distributor 434.

The protocol conversion block 426 has the same number of protocol conversion circuits 426-1 through 426-N as the number of modules to be connected. Each of the protocol conversion circuits 426-1 through 426-N receives signals complying with a protocol used by a corresponding master, and converts the received signals into signals complying with an intermediary protocol used by the internal bus of a corresponding slave.

Here, each of the protocol conversion circuit 426-1 through 426-N interoperates with the arbitrator 428, the controller 430, the address decoder 432 and the distributor 434. However, in FIG. 7, for convenience of explanation, it is shown as if the protocol conversion circuit block 426 as a whole interoperates with the arbitrator 428, the controller 430, the address decoder 432 and the distributor 434.

The arbitrator 428 outputs control signals (CTR1 through CTR4) to control the controller 430 based on the control signals output from the protocol conversion circuit block 426.

Based on control signals (CNTR1) output from the protocol conversion circuit block 426, that is, the protocol conversion circuits 426-1 through 426-N, respectively, and control signals (CTR1 through CTR4) output from the arbitrator 428, the controller 430 generates control signals (CNTR5) to control the address decoder 432 and control signals (CNTR4) to control the arbitrator 428. The controller 430 includes a data transfer control unit 4301, an address decoder control unit 4302, a response control unit 4304, and a port distribution control unit 4304.

The data transfer control unit 4301 in response to at least one corresponding control signal among control signals (CNTR1) output from the protocol conversion circuit block 426 and the control signal (CTR1) output from the arbitrator 428, transmits data (DATA) output from each of the protocol conversion circuits 426-1 through 426-N, to the distributor 434, or transmits data (DATA) input from the distributor 434 to a corresponding protocol conversion circuit 426-1 through 426-N.

The address decoder control unit 4302 in response to at least one corresponding control signal among control signals (CNRT1) and the control signal (CTR2) output from the arbitrator 428, outputs control signals (CNTR5) to control the operation of the address decoder 432, to the address decoder 432.

The response controller 4303 in response to at least one corresponding control signal among control signals (CNTR1) output from the protocol conversion circuit block 426 and the control signal (CTR3) output from the arbitrator 428, or in response to at least one corresponding control signal among control signals output from the arbitrator 428, transmits information on the state of an external memory to be accessed, or information (RES) related to the transmission state of data (DATA), to the protocol conversion circuit block 426. Also, the response control unit 4303 generates control signals (CNTR2) to control the operation of the protocol conversion circuit block 426.

The port distribution control unit 4304, based on at least one corresponding control signal among control signals (CNTR1) output from the protocol conversion circuit block 426 and the control signal (CTR4) output from the arbitrator 428, outputs control signals (CNTR4) to the distributor 434 that control the operation states of ports of the memory controller 310. That is, the port distribution control unit 4304 performs a function to select a corresponding port to be used by a corresponding master.

The address decoder 432, response to control signals (CNTR5) output from the controller 430, decodes an address (ADD) output from the protocol conversion circuit block 426, and as the result outputs information (MSEL) to the distributor 434 regarding an external memory which a master given priority by the arbitrator 428 desires to access.

The address decoder 432 includes a decoding unit 4321 and a memory selector 4322. The decoding unit 4321 in response to at least one corresponding control signal among control signals (CNTR5) output from the controller 430, decodes an address (ADD) output from the protocol conversion circuit block 426, and outputs the result to the memory selector 4322.

The memory selector 4322, based on at least one corresponding control signal among control signals (CNTR5) output from the controller 430 and the output signal of the decoding unit 4321, generates and outputs information (MSEL) to the distributor 434 regarding the external memory which the master given priority by the arbitrator 428 desires to access. The information regarding the external memory, for example, the number of bits, is determined by the number of the external memories.

The distributor 434 receives the address (ADD) output from the protocol conversion circuit block 426, data (DATA) and control signal (CNTR4) output from the controller 430, and information (MSEL) regarding the external memory output from the address decoder 432, and based on these signals (ADD, DATA, CNTR4, and MSEL), transmits signals to access the external memory, to a corresponding port of the slave. Accordingly, the distributor 434 has a switching function and/or a multiplexing function.

The signals (CNTR1, DATA, and ADD) output from the protocol conversion circuit block 426 are converted into signals and which comply with a protocol used in the slave, are manipulated by interoperations of the controller 430, the address decoder 432, and the distributor 434, and the converted & manipulated signals are input to the memory controller 310 through the corresponding bus 334 and port 312. Accordingly, based on the signals output from the protocol conversion block 426 and the middleman circuit 427, the slave accesses the external memory which the master desires to access.

Referring to FIGS. 4 and 7, the protocol conversion and arbitration circuit 424-1 receives signals complying with the second protocol used by a master (for example, module_1 420-1), through the bus 422-1, converts the received signals into signals complying with the first protocol of the slave (for example, the memory controller 310) via the corresponding protocol conversion circuit, namely 426-1, converts again the converted signals into signals complying with the first protocol used in the memory controller 310 via the arbitrator 428, the controller 430, the address decoder 432, and the distributor 434, and then outputs the converted and manipulated signals to the memory controller 310 through a corresponding port (for example, 412-1) of the memory controller 310.

The protocol conversion and arbitration circuit 424-1 receives signals output from the external memory accessed (or, in other words, as requested by the master 420-1) via the corresponding first port 412-1 and the bus 423-1, the received data into signals complying with the intermediary protocol used in the system bus (not shown) of the memory controller 310 by using the controller 430, the address decoder 432, and the distributor 434, signals, and converts again the converted signals into signals complying with the second protocol used in module_1 420-1 by using the protocol conversion circuit 426-1, and transmits the twice-converted signals to module_1 420-1 through the bus 422-1.

Further, the protocol conversion and arbitration circuit 424-1 receives signals complying with the second protocol used by a master (for example, module_N 420-N) through the bus 422-N, converts the received signals into signals complying with the first protocol used by the slave (for example, the memory controller 310) via the protocol conversion circuit 426-N, converts again the converted signals into signals complying with the first protocol used in the memory controller 310 by using the arbitrator 428, the controller 430, the address decoder 432, and the distributor 434, and then outputs the twice-converted signals to the memory controller 310 through a corresponding port (for example, 412-N) of the memory controller 310.

Further, the protocol conversion and arbitration circuit 424-1 receives signals output from the external memory accessed by the module_N 420-N via the corresponding N-th port 412-N and the bus 423-N, buffers the received data into signals complying with the second protocol used by the internal bus (not shown) of the memory controller 310 by using the controller 430, the address decoder 432, and the distributor 434, converts the converted signals into signals complying with the second protocol used in module_N 420-N by using the protocol conversion circuit 426-N, and transmits the twice-converted signals to module_N 420-N through the bus 422-N.

The first port of the protocol conversion and arbitration circuit 424-2 and the (N+1)-th port 418 of the memory controller 310 are connected to each other through the bus 454, the second port of the protocol conversion and arbitration circuit 424-2 and the (N+N)-th port 416 of the memory controller 310 are connected through the bus 456, the third port of the protocol conversation and arbitration circuit 424-2 and the system bus 370 are connected through the bus 458, and the fourth port of the protocol conversion and arbitration circuit 424-2 and the module 448 are connected through the bus 452.

The operation of the protocol conversion and arbitration circuit 424-2 is essentially the same as that of the protocol conversion and arbitration circuit 424-1. That is, the protocol conversion and arbitration circuit 424-2 receives signals complying with the first protocol, converts the received signals into signals complying with the third protocol used in the system bus 370 through the two-stepped conversion process as described above, and transmits the converted signals to the system bus 370.

Also, the protocol conversion and arbitration circuit 424-2 receives signals complying with the third protocol used in the system bus 370, converts the received signals into signals complying with the first protocol used in the memory controller 310 through the two-stepped conversion process as described above, and transmits the converted signals to the memory controller 310 through corresponding ports 416 and 418.

Further, the protocol conversion and arbitration circuit 424-2 converts a signal complying with the first protocol used in the memory controller 310, into a signal complying with the third protocol used in the module 448, and converts a signal complying with the third protocol used in the module 440 into a signal complying with the first protocol used in the memory controller 310. Accordingly, the protocol conversion and arbitration circuit 424-2 has a function for converting a protocol, and a function for arbitrating signals output from the module 448 and the system bus 370, at the same time.

The 2-3 protocol conversion circuit 438-1 is connected between module_1 420-1 and the system bus 370 through corresponding buses 436 and 440, and converts a signal complying with the second protocol into a signal complying with the third protocol, or a signal complying with the third protocol into a signal complying with the second protocol.

Similarly, the 2-3 protocol conversion circuit 438-N is connected between module_N 420-N and the system bus 370 through corresponding buses 442 and 446, and converts a signal complying with the second protocol into a signal complying with the third protocol, or a signal complying with the third protocol into a signal complying with the second protocol.

The module 448 using the third protocol is connected between the system bus 370 and the protocol conversion and arbitration circuit 424-2 through corresponding buses 450 and 452.

The module 462 using the first protocol is connected between the (N+3)-th port 414 of the memory controller 310 and the 1-3 protocol conversion circuit 466 through corresponding buses 460 and 464.

The 1-3 protocol conversion circuit 466 is connected between the module 462 and the system bus 370 through corresponding buses 464 and 468, and converts a signal complying with the first protocol into a signal complying with the third protocol, or a signal complying with the third protocol into a signal complying with the first protocol.

Accordingly, each of the modules$_{13}$ 1 420-1 through module_N 420-N, module 448 and module 462 of the system having the protocol conversion and arbitration circuit according to an example embodiment of the present invention can access an external memory without using the system bus 370. As a result, the entire operation of the system is improved.

Figure 5:
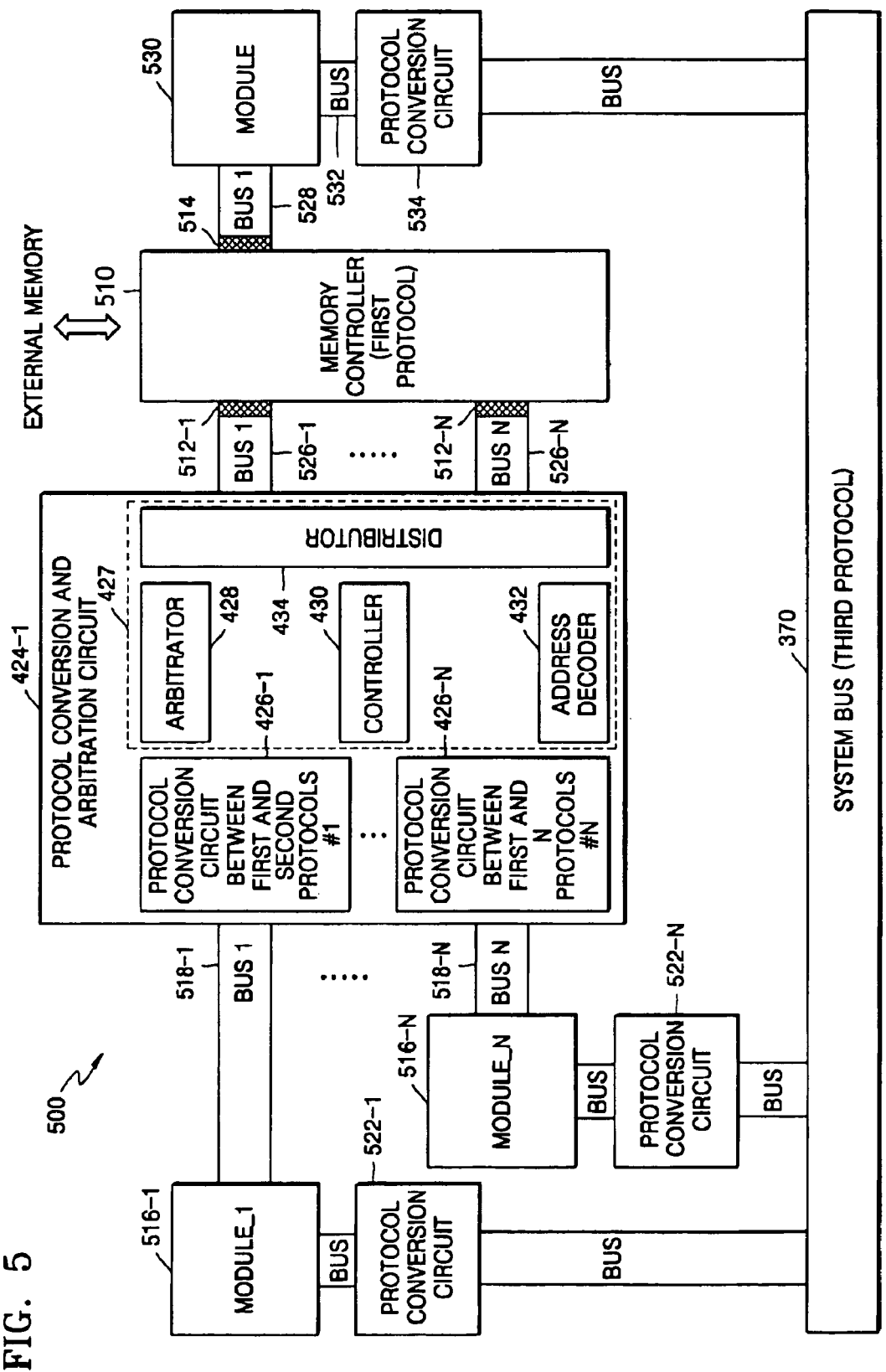
FIG. 5 is a block diagram of a system according to still at least one other embodiment of the present invention in which one protocol conversion and arbitration circuit is connected to a plurality of modules using different protocols.

FIG. 5 is a block diagram of a system 500 according to at least one other embodiment of the present invention in which one protocol conversion and arbitration circuit is connected to a plurality of modules using different protocols.

Referring to FIG. 5, the system 500 includes a memory controller 310, a system bus 370, a protocol conversion and arbitration circuit 424-1, a plurality of modules, namely module_1 516-1 through module_N 516-N, and module 530, a plurality of protocol conversion circuits 522-1 through 522-N, and 534, and a plurality of buses. The system 500 can be implemented as a semiconductor chip.

The memory controller 310 has a plurality of ports 512-1 through 512-N, and 514. It is assumed that the memory controller 310 and the module 530 use the first protocol, the plurality of module_1 516-1 through module_N 516-N uses protocols different to each other, and the system bus 370 uses the third protocol.

The plurality of modules module_1 516-1 through module_N 516-N are connected to left ports (not shown), respectively, of the protocol conversion and arbitration circuit 424-1 through corresponding buses 518-1 through 518-N. The ports 512-1 through 512-N of the memory controller 310 are connected to right ports (not shown), respectively, of the protocol conversion and arbitration circuit 424-1 through corresponding buses 526-1 through 526-N.

Figure 10:
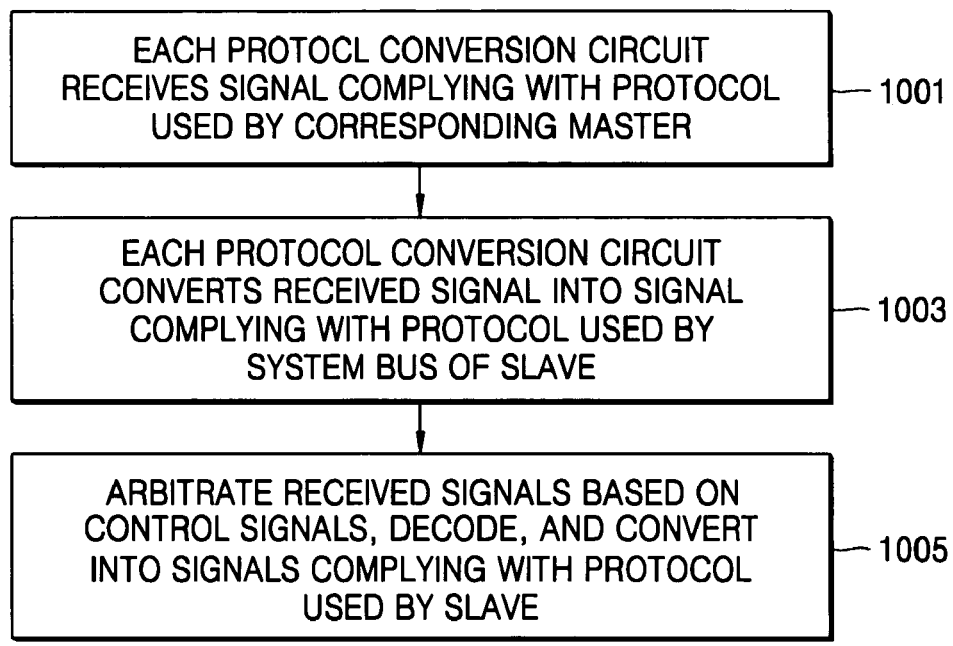
FIG. 10 is a flowchart according to at least one embodiment of the present invention that can explain (at least in part) the operation of the protocol conversion and arbitration circuits shown in FIGS. 4 and 5.

The operation of the protocol conversion and arbitration circuits shown in FIGS. 4 and 5 can be explained (according to at least one embodiment of the present invention) at least in part by referring to the flowchart of FIG. 10.

Referring to FIGS. 5, 7, and 10, each of the protocol conversion circuits 426-1 through 426-N of the protocol conversion and arbitration circuit 424-1 receives signals complying with a protocol used in a corresponding module_1 516-1 through module_N 516-N in step 1001.

Each of the protocol conversion circuits 426-1 through 426-N converts the received signals into signals complying with the protocol used by the slave (for example, the memory controller 310), and outputs the converted signals (CNTR1, DATA, and ADD) in step 1003.

The signals (CNTR1, DATA, and ADD) output from each of the protocol conversion circuits 426-1 through 426-N are converted into signals complying with the first protocol used in the memory controller 310 by via the interoperations of the arbitrator 428, the controller 430, the address decoder 432, and the distributor 434, that is, through control, arbitration, and decoding. The converted signals are input to the memory controller 310 through corresponding ports in step 1005.

Figure 11:
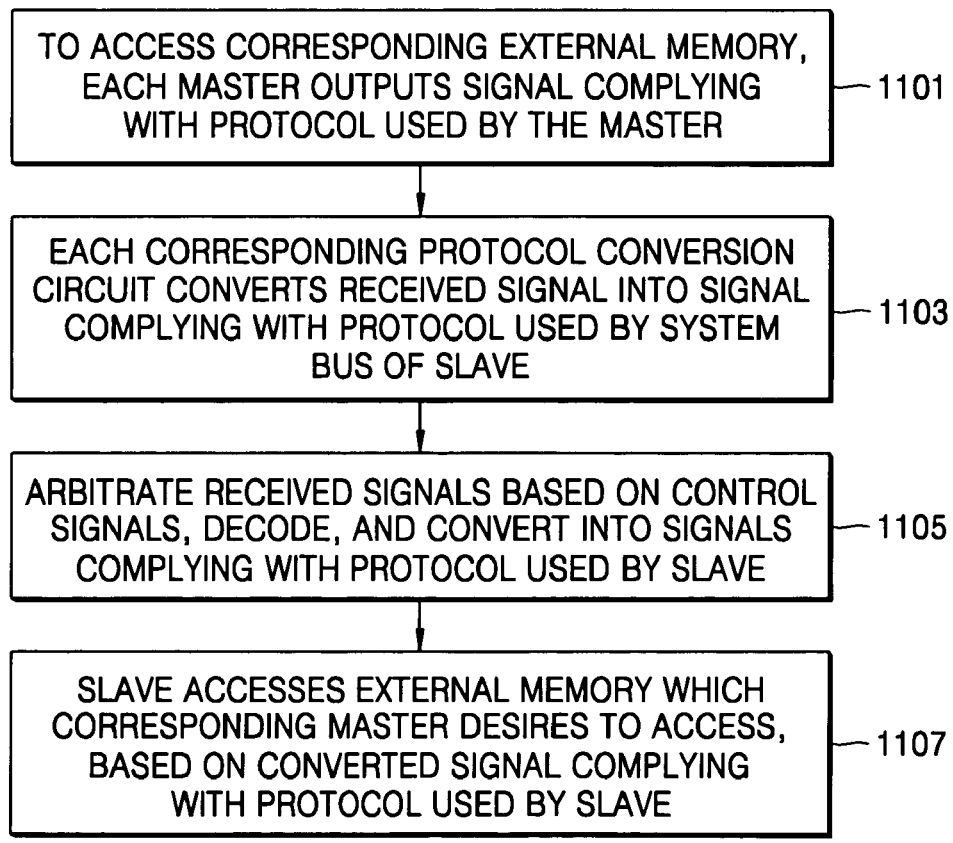
FIG. 11 is a flowchart according to at least one embodiment of the present invention that can explain (at least in part) a method for a plurality of masters to access an external memory through a protocol conversion and arbitration circuit.

FIG. 11 is a flowchart to explain a method for a plurality of masters to access an external memory through a protocol conversion and arbitration circuit according to at least one embodiment of the present invention. Referring to FIGS. 5, 7, and 11, the operation of the master module_1 516-1 to access SRAM0 will now be explained.

It is assumed, for example, in the following discussion that: an external memory is formed with SRAM0, SRAM1, SDRAM0, and SDRAM 1; SRAM0 uses an address area expressed by 0x00000000 through 0x1FFFFFFF; SRAM1 uses an address area expressed by 0x20000000 through 0x3FFFFFFF; SDRAM0 uses an address area expressed by 0x40000000 through 0x5FFFFFFF; SDRAM1 uses an address area expressed by 0x60000000 through 0x7FFFFFFF; the arbitrator 428 gives a priority order to the module_1 516-1; and the first module_1 516-1 outputs an address, 0x10000000.

In order to access a corresponding external memory, at least one master (not shown) connected to each of the modules module_1 516-1 through module_N 516-N and the system bus 370 outputs signals complying with a protocol used by the master, to the protocol conversion and arbitration circuit 424-1 through a corresponding bus in step 1101.

Each of the protocol conversion circuits 426-1 through 426-N converts the received signals into signals complying with the first protocol used by the memory controller 310, and outputs the converted signals (CNTR1, DATA, and ADD) in step 1103.

The arbitrator 428 receives the signals (CNTR1) output from each of the protocol conversion circuits 426-1 through 426-N, and based on the received signals (CNTR1), gives priority for use of the memory controller 310 to the module_1 516-1.

The address decoder 432, based on the control signals (CNTR5) output from the controller 430 and an address (ADD=0x10000000) output from the module_1 516-1, generates and transmits information (MSEL) to the distributor 434 regarding the desired access of SRAM0.

The distributor 434, based on a variety of signals (DATA, CNTR4, and MSEL) output from the controller 430, transmits a variety of signals regarding the desired access of SRAM0 to the memory controller 310 through a corresponding port (for example, 512-1) of the memory controller 310.

That is, the arbitrator 428, the controller 430, the address decoder 432, and the distributor 434, based on the control signals (CNRT1, CNTR4, CNTR5, and MSEL), arbitrate signals output from each of the protocol conversion circuits 426-1 through 426-N, based on the arbitration result, decode the address (ADD), and transmit signals complying with the protocol used in the memory controller 310, to the memory controller 310 through corresponding ports in step 1105.

The memory controller 310 can access the external memory (SRAM0) which the corresponding module_1 516-1 desires to access, based on signals complying with the protocol (that have been converted by the protocol conversion and arbitration circuit 424-1) in step 1107. Accordingly, without using the system bus 370, the module_1 516-1 can access the desired external memory, through the memory controller 310.

Accordingly, load to the system bus 370 of the system, e.g., 500, decreases such that the entire performance of the system increases. Also, even when at least one module using (or supporting) a different protocol is desired to be used in a system, the module can be used immediately in the system without changing the design of the module or revising the design.

In a system having a multiport memory controller and at least one protocol conversion and arbitration circuit such as are described above, each of the plurality of modules can transmit data to and receive data from the external memory through the multiport memory controller without using the system bus such that the data processing time decreases. Accordingly, since the load on the system bus decreases, the performance of the system is improved.

Also, since the plurality of modules supporting different protocols can be connected to corresponding ports, respectively, of the multiport memory controller at the same time, conventional modules can be used immediately without changing the design. Since the conventional modules can be used without change, the time for designing the system can be reduced.

While the present invention has been particularly shown and described with reference to example embodiments thereof, it will be understood by those of ordinary skill in the art that various changes in form and details may be made therein without departing from the spirit and scope of the present invention.

What is claimed is:

1. A liaison circuit to facilitate access by a master to an external memory via a slave, the liaison circuit comprising:
   a protocol conversion circuit to receive signals representing a request from the master for access to the external memory, the received signals complying with a second protocol used by the master and containing a target address located in the external memory, and to convert the received signals into signals complying with a first protocol used by the slave; and
   a middleman circuit to receive, from the protocol conversion circuit, the converted signals and based thereon to generate an identification signal indicating which of a plurality of units comprising the external memory contains the target address.

2. The circuit of claim 1, wherein the middleman circuit comprises:
   a controller to receive control signals and data output from the protocol conversion circuit, and to responsively provide address decoder control signals;
   an address decoder to decode, in response to the address decoder control signals, an address output from the protocol conversion circuit and based thereon to generate the identification signal; and
   a distributor to receive the address from the protocol conversion circuit, the control signals and data output from the controller, and the information regarding the external memory from the address decoder, and based thereon to provide signals complying with the first protocol used by the slave.

3. The circuit of claim 2, wherein the controller comprises:
   a data transfer controller to transmit, in response to at least a first one among control signals from the protocol conversion circuit, data from the protocol conversion circuit to the distributor or to transmit data from the distributor to the protocol conversion circuit;
   an address decoder controller to provide, in response to at least a second one among the control signals from the protocol conversion circuit, the address decoder control signals;
   a response controller to receive, in response to at least a third one among the control signals from the protocol conversion circuit, or in response to at least one among the control signals from the distributor, information related to the state of the external memory which the master desires to access, and to transmit the received information to the protocol conversion circuit; and
   a port distribution controller to generate, in response to at least a fourth one among the control signals from the protocol conversion circuit, control signals for controlling the operation of the distributor.

4. A method to facilitate access by a master to an external memory via a slave, the method comprising:
   receiving signals representing a request from the master for access to the external memory, the received signals complying with a second protocol used by the master and containing a target address in the external memory;

converting the received signals into signals complying with a first protocol used by the slave;
receiving the converted signals; and
generating an identification signal indicating which of a plurality of units comprising the external memory contains the target address based upon the converted signals.

5. The method of claim 4, wherein:
the converting includes providing at least one first control signal and an address; and
the generating includes
providing address decoder control signals in response to the at least one first control signal;
decoding the address based on the address decoder control signals and based thereon generating the identification signal.

6. The method of claim 4, further comprising:
the slave accessing the external memory based on the converted signals and the identification signal.

7. A liaison apparatus to facilitate access by a plurality of masters to an external memory via a slave, the liaison apparatus comprising:
a plurality of protocol conversion means for converting an access request of a corresponding one of the masters from a given first protocol thereof to a given second protocol of the slave, respectively, the converted signals respectively including target addresses located in the external memory; and
middleman means for receiving, from a given one amongst the plurality of protocol conversion means, the corresponding converted signals and based thereon for generating an identification signal indicating which of a plurality of units comprising the external memory contains the corresponding target address.

8. A method to facilitate access by a plurality of masters to an external memory via a slave, the method comprising:
each of a plurality of protocol conversion circuits receiving first sets of signals representing requests from the masters for access to the external memory, respectively, each first set of signals complying with a second protocol used by the corresponding master, respectively, and each first set of signals including a target address in the external memory, respectively;
the plurality of protocol conversion circuits converting the received first sets of signals into second sets of signals complying with a first protocol used by the slave, respectively;
arbitrating the second sets of converted signals based on control signals included within the second sets of signals, respectively;
decoding a target address associated with the arbitration result; and
generating, for each decoded target address in a given set of converted signals, an identification signal indicating which of a plurality of units comprising the external memory contains the given target address.

9. The method of claim 8, further comprising:
the slave accessing the external memory based on the converted signals and the identification signal.

10. A liaison circuit to facilitate access by a plurality of masters to an external memory via a slave, the liaison circuit comprising:
a plurality of protocol conversion circuits, which receive first sets of signals representing requests from masters for access to the external memory, the first sets of signals complying with second protocols used by the corresponding masters, respectively, each first set of signals containing a respective target address in the external memory, each of the plurality of protocol conversion circuits being operable to convert the corresponding received first set of signals into a second set of signals complying with a protocol used by the slave;
an arbitrator which receives the second sets of signals output from the plurality of protocol conversion circuits, and based thereon outputs arbitration signals; and
a middleman circuit, operable upon a given set of second signals and the arbitration signals, to generate an identification signal indicating which of a plurality of units comprising the external memory contains the corresponding target address.

11. The circuit of claim 10, wherein the middleman circuit comprises:
a controller which, based on a given set of the second signals and the arbitration signals, transmits data from an input end thereof through to an output end thereof and generates address decoder control signals;
an address decoder which, in response to the address decoder control signals, decodes the corresponding target address from a given set of signals and based thereon generates the corresponding identification signal; and
a distributor which, based on the corresponding target address output from the corresponding protocol conversion circuit, control signals and data output from the controller, and the identification signal, provides signals complying with the first protocol to the slave.

12. A system for facilitating access by a master to an external memory via a memory controller albeit without necessarily having to use a system bus, the system comprising:
the memory controller which has a plurality of ports;
the master;
the system bus;
a first liaison circuit which is connected between a first one of the plurality of ports and the master; and
a second liaison circuit which is connected between the master and the system bus;
the first liaison circuit being operable to receive a first set of signals from the master that are compliant with a second protocol of the master and convert the first set into a second set of signals compliant with a first protocol of the memory controller, and vice-versa; and
the second liaison circuit being operable to receive a third set of signals from the master that are compliant with the second protocol of the master and convert the third set into a fourth set of signals compliant with a third protocol of the system bus, and vice-versa.

13. The system of claim 12, further comprising:
a third liaison circuit which is connected between the memory controller and the system bus, the third liaison circuit being operable to receive a fifth set of signals from the system bus that are compliant with the third protocol of the system bus and convert the fifth set into a sixth set of signals compliant with a first protocol of the memory controller, and vice-versa.

14. A system for facilitating access by a plurality of masters to an external memory via a memory controller albeit without necessarily having to use a system bus, the system comprising:
the memory controller which has a plurality of ports;
the system bus;
the plurality of masters;
a first liaison circuit;

a first plurality of buses connected between the plurality of ports of the memory controller and the liaison circuit, respectively; and a second plurality of buses connected between the plurality of masters and the liaison circuit, a plurality of second liaison circuits connected between the plurality of masters and the system bus, respectively;

the first liaison circuit being operable to receive first sets of signals from the masters that are compliant with second protocols of the masters, respectively, and convert the firsts set into a respective second sets of signals compliant with a first protocol of the memory controller, and vice-versa; and each second liaison circuit being operable to receive third sets of signals from the masters that are compliant with the second protocols, respectively, and convert the third sets into respective fourth sets of signals compliant with a third protocol of the system bus, and vice-versa.

15. The system of claim 14, wherein there are at least two or more different second protocols.

16. The system of claim 14, wherein the second protocols used in the plurality of masters are identical.

17. The system of claim 14, further comprising:

a third liaison circuit which is connected between the memory controller and the system bus, the third liaison circuit being operable to receive a fifth set of signals from the system bus that are compliant with the third protocol of the system bus and convert the fifth set into a sixth set of signals compliant with a first protocol of the memory controller, and vice-versa.

* * * * *